(12) United States Patent
Ahangarnejad

(10) Patent No.: US 12,691,864 B2
(45) Date of Patent: Jul. 28, 2026

(54) SYSTEMS AND METHOD FOR DRIVER CENTRIC AUTOMATION

(71) Applicant: STEERING SOLUTIONS IP HOLDING CORPORATION, Saginaw, MI (US)

(72) Inventor: Arash Hosseinian Ahangarnejad, Canyon Country, CA (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 112 days.

(21) Appl. No.: 18/428,010

(22) Filed: Jan. 31, 2024

(65) Prior Publication Data

US 2025/0276678 A1 Sep. 4, 2025

(51) Int. Cl.
| | |
|---|---|
| *B60W 10/20* | (2006.01) |
| *B60W 20/11* | (2016.01) |
| *B60W 50/00* | (2006.01) |
| *B62D 5/09* | (2006.01) |

(52) U.S. Cl.
CPC ............ *B60W 10/20* (2013.01); *B60W 20/11* (2016.01); *B60W 50/00* (2013.01); *B62D 5/091* (2013.01); *B60W 2050/0031* (2013.01); *B60W 2520/10* (2013.01); *B60W 2520/14* (2013.01); *B60W 2520/20* (2013.01); *B60W 2540/18* (2013.01); *B60W 2552/40* (2020.02)

(58) Field of Classification Search
CPC ...... B60W 10/20; B60W 20/11; B60W 50/00; B60W 2050/0031; B60W 2520/10; B60W 2520/14; B60W 2520/20; B60W 2540/18; B60W 2552/40; B62D 5/091

USPC .......................................................... 701/41
See application file for complete search history.

(56) References Cited

U.S. PATENT DOCUMENTS

| | | | | |
|---|---|---|---|---|
| 6,662,898 | B1 * | 12/2003 | Mattson ................... | B62D 6/04 |
| | | | | 180/443 |
| 2018/0215409 | A1 * | 8/2018 | Pramod .............. | B62D 15/0235 |
| 2019/0071084 | A1 * | 3/2019 | Tuncali .............. | B60W 30/165 |
| 2019/0278268 | A1 * | 9/2019 | Rezaeian ............. | G05D 1/0061 |

(Continued)

FOREIGN PATENT DOCUMENTS

| | | |
|---|---|---|
| DE | 112019004211 T5 | 5/2021 |
| DE | 102021105896 A1 | 12/2021 |
| DE | 102022119729 A1 | 3/2023 |

OTHER PUBLICATIONS

DE Office Action for corresponding DE application No. 102025102977.6; Jul. 12, 2025; 4 pgs.; English language translation—4 pgs.

*Primary Examiner* — Yi-Kai Wang

(74) *Attorney, Agent, or Firm* — Dickinson Wright PLLC

(57) ABSTRACT

A method for steering control includes receiving at least one steering input value, receiving at least one vehicle speed value, and determining, based on the at least one steering input value and the at least one vehicle speed value, a vehicle sideslip angle and a yaw rate. The method also includes generating an initial steering control value based on the vehicle sideslip angle, the yaw rate, and a reference yaw rate value. The method also includes determining a final steering control value based on the initial steering control value and the at least one steering input value, and selectively controlling at least one aspect of a vehicle steering system based on the final steering control value.

20 Claims, 5 Drawing Sheets

(56)     References Cited

U.S. PATENT DOCUMENTS

| | | | |
|---|---|---|---|
| 2019/0291736 A1* | 9/2019 | Park | B60W 10/10 |
| 2020/0277006 A1* | 9/2020 | Zhang | B62D 5/0487 |
| 2020/0331520 A1* | 10/2020 | Varunjikar | B60W 40/103 |
| 2023/0322208 A1* | 10/2023 | Rojas | B60W 50/085 |
| | | | 701/41 |

* cited by examiner

SYSTEMS AND METHOD FOR DRIVER CENTRIC AUTOMATION

TECHNICAL FIELD

This disclosure relates to vehicle steering, and in particular to systems and methods for providing driver centric steering automation.

BACKGROUND

A vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an electronic power steering (EPS) system, a steer-by-wire (SbW) steering system, a hydraulic steering system, or other suitable steering system and/or other suitable systems (e.g., such as a braking system, propulsion system, and the like). Such systems of the vehicle typically control various aspects of vehicle steering (e.g., including providing steering assist to an operator of the vehicle, controlling steerable wheels of the vehicle, and the like), vehicle propulsion, vehicle braking, and the like.

SUMMARY

This disclosure relates generally to steering systems.

An aspect of the disclosed embodiments includes a method for steering control. The method includes receiving at least one steering input value, receiving at least one vehicle speed value, and determining, based on the at least one steering input value and the at least one vehicle speed value, a vehicle sideslip angle and a yaw rate. The method also includes generating an initial steering control value based on the vehicle sideslip angle, the yaw rate, and a reference yaw rate value. The method also includes determining a final steering control value based on the initial steering control value and the at least one steering input value, and selectively controlling at least one aspect of a vehicle steering system based on the final steering control value.

Another aspect of the disclosed embodiments includes, a system for steering control. The system includes a processor, and a memory. The memory includes instructions that, when executed by the processor, cause the processor to: receive at least one steering input value; receive at least one vehicle speed value; determine, based on the at least one steering input value and the at least one vehicle speed value, a vehicle sideslip angle and a yaw rate; generate an initial steering control value based on the vehicle sideslip angle, the yaw rate, and a reference yaw rate value; determine a final steering control value based on the initial steering control value and the at least one steering input value; and selectively control at least one aspect of a vehicle steering system based on the final steering control value.

Another aspect of the disclosed embodiments includes an apparatus for steering control. The apparatus includes a processor and a memory. The memory includes instructions that, when executed by the processor, cause the processor to: receive at least one steering input value; receive at least one vehicle speed value; determine, based on the at least one steering input value and the at least one vehicle speed value and using a non-linear bicycle model, a vehicle sideslip angle and a yaw rate; generate a reference yaw rate value based on the at least one steering input value, the at least one vehicle speed value, and a tire-road friction coefficient; generate an initial steering control value based on the vehicle sideslip angle, the yaw rate, and the reference yaw rate value; determine a final steering control value based on the initial steering control value and the at least one steering input value; and selectively control at least one aspect of a vehicle steering system based on the final steering control value.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
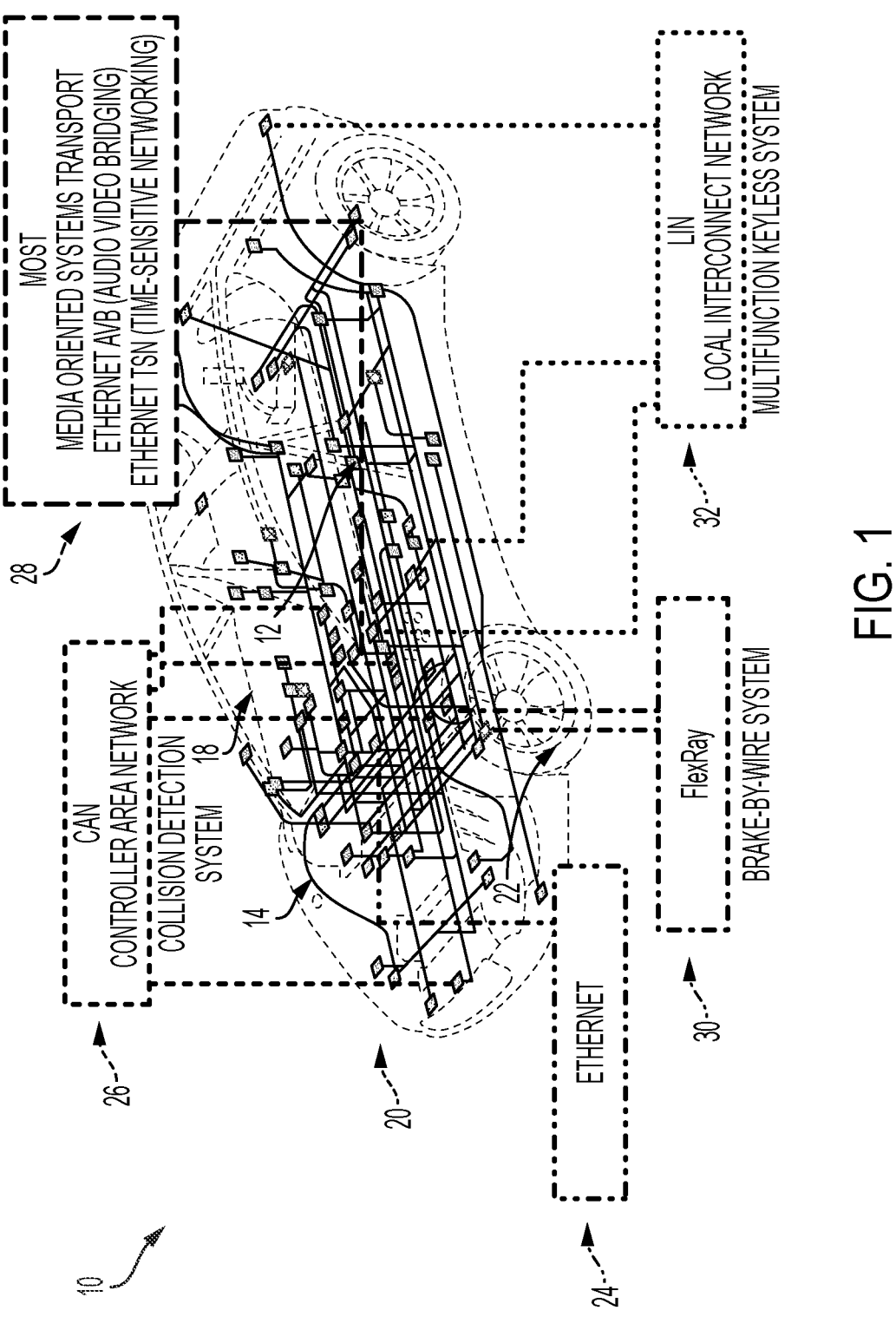
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an electronic power steering (EPS) system, a steer-by-wire (SbW) steering system, a hydraulic steering system, or other suitable steering system and/or other suitable systems (e.g., such as a braking system, propulsion system, and the like). Such systems of the vehicle typically control various aspects of vehicle steering (e.g., including providing steering assist to an operator of the vehicle, controlling steerable wheels of the vehicle, and the like), vehicle propulsion, vehicle braking, and the like.

Increasingly, model predictive control (MPC) (e.g., which may include a control technique used to control a process given a set of constraints) is being used for vehicle stability control due to a capability of handling input saturation, and state constraints in a dynamic environment. However, such systems do not provide for vehicle-level stability control.

Accordingly, systems and methods, such as those described herein, configured to improve vehicle handling and stability in adverse conditions via an active steering assist system, may be desirable. Yaw rate has typically been an important indicator to improve the stability of the vehicle. As such, the systems and methods described herein may be configured to use active steer assist control of the vehicle to achieve the stability control, which may formulated with two important objectives: improved handling and stability; and smooth steering (e.g., or control action, such that effort applied by the driver allows the driver and/or passengers to feel relatively comfortable).

In some embodiments, the systems and methods described herein may be configured to use a steering systems that includes a stability control system configured to ensure safe driving of the vehicle according to an operation of a driver of an associated vehicle. Such stability control may be challenging due to complex practical conditions, such as wind disturbances, tire pressure imbalance, tire wear, and the like. Due to untimely and inaccurate application of control inputs, many vehicle accidents occur annually.

A steer assist control system may be used to improve vehicle handling and stability, which may help the driver stabilize the vehicle and provide collision avoidance based on the vehicle state information (e.g., which may include yaw rate, lateral acceleration, and vehicle sideslip angle.)

In some embodiments, the systems and methods described herein may be configured to use MPC or other suitable control approach using several systems. The systems and methods described herein may be configured to use a model subsystem that includes desired values of the vehicle yaw rate, which may be calculated based on steering angle, vehicle velocity, and tire-road friction coefficient. The systems and methods described herein may be configured to use driver input, such as steering angle and velocity, and a road friction coefficient (e.g., provided by a vehicle simulation mechanism). The systems and methods described herein may be configured to use a non-linear bicycle model, provided with the steering angle, velocity, and road friction coefficient, to calculate the vehicle states and parameters, such as front and rear lateral force, lateral acceleration, yaw rate, vehicle sideslip angle, and the like. The non-linear bicycle model may comprise an infinite loop that calculates the vehicle states based on the driver input.

In the non-linear bicycle model, a Fiala tire model may be used to calculate front and rear axle lateral forces, according to:

$$F_y = \begin{cases} -C_\alpha \tan\alpha + \dfrac{C_\alpha^2}{3\mu F_z}|\tan\alpha|\tan\alpha \\ -\dfrac{C_\alpha^2}{27\mu^2 F_z^2}\tan^3\alpha, \quad |\alpha| < \operatorname{atan}\left(\dfrac{3\mu F_z}{C_\alpha}\right) \\ -\mu F_z \operatorname{sgn}\alpha. \qquad \text{otherwise} \end{cases}$$

In some embodiments, the systems and methods described herein may be configured to, after tuning the tire model for the vehicle used in the simulation in order to find cornering stiffness (C_alpha), estimate slip angle (alpha) based on the non-linear bicycle model. The systems and methods described herein may be configured to provide the vehicle sideslip angle and yaw rate to the MPC along with a reference yaw rate generated at a reference generator block, which may be described according to:

$$r_{ref} = \tanh\left(\frac{v_x \delta_{driver}}{L\left(1 + \frac{K_{us}}{L}v_x^2\right)}\right)$$

$$K\_us = 0 \text{ (understeer gradient)} \rightarrow r_{ref} = \tanh\left(\frac{v_x \delta}{L}\right)$$

$$|r| < \frac{\mu g}{v_x}$$

Figure 3:
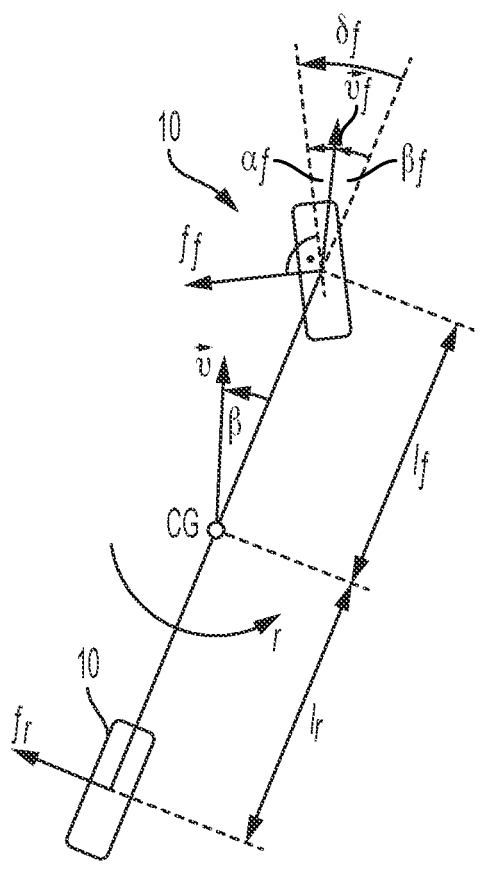
FIG. 3 generally illustrates vehicle dynamics according to the principles of the present disclosure.

In some embodiments, the systems and methods described herein may be configured to use a state space model, as is generally illustrated in FIG. 3 and described according to:

$$\begin{cases} m(\dot{v}_y + \dot{\psi}v_x) = F_{yr} + F_{yf} \\ I_z\ddot{\psi} = l_f F_{yf} - l_r F_{yr} \end{cases}$$

$$\begin{cases} \dot{\beta} = \dfrac{1}{mv_x}\left(-C_f\left(\beta + \dfrac{l_f r}{v_x} - \delta\right) - C_r\left(\beta - \dfrac{l_r r}{v_x}\right)\right) - r \\ \dot{r} = \dfrac{1}{I_z}\left(-l_f C_f\left(\beta + \dfrac{l_f r}{v_x} - \delta\right) + l_r C_r\left(\beta - \dfrac{l_r r}{v_x}\right)\right) \end{cases}$$

$$\begin{bmatrix} \dot{\beta} \\ \dot{r} \end{bmatrix} =$$

$$\begin{bmatrix} -\dfrac{c_f + c_r}{mv_x} & -1 - \dfrac{l_f C_f - l_r C_r}{mv_x^2} \\ -\dfrac{l_f C_f - l_r C_r}{I_z} & -\dfrac{l_f^2 C_f + l_r^2 C_r}{mv_x^2} \end{bmatrix}\begin{bmatrix} \beta \\ r \end{bmatrix} + \begin{bmatrix} \dfrac{C_f}{mv_x} \\ \dfrac{l_f C_f}{I_z} \end{bmatrix}\delta_f + \begin{bmatrix} \dfrac{C_f}{mv_x} \\ \dfrac{l_f C_f}{I_z} \end{bmatrix}u$$

The state equation of the system is discretized by Euler method:

$$\frac{dX}{dt} = g(x) \rightarrow X(k+1) = X(k) + T_s(g(x))$$

The discrete form can be written as incremental form, where a static error is eliminated by using an incremental mode. The systems and methods described herein may be configured to use a state space augmented model, which may be described according to:

$$x_{k+1} = Ax_k + Bu_k = Ax_k + Bu_k - Bu_{k-1} + Bu_{k-1} =$$

$$Ax_k + B(u_k - u_{k-1}) + Bu_{k-1} = Ax_k + B\Delta u_k + Bu_{k-1}$$

$$\begin{bmatrix} x_{k+1} \\ u_k \end{bmatrix} = \begin{bmatrix} A & B \\ 0 & I \end{bmatrix}\begin{bmatrix} x_k \\ u_{k-1} \end{bmatrix} + \begin{bmatrix} B \\ I \end{bmatrix}\Delta u_k = A_a x_a + B_a \Delta u_k$$

$$\begin{bmatrix} \beta_{k+1} \\ r_{k+1} \\ u_{k+1} \end{bmatrix} = \begin{bmatrix} -\dfrac{C_f + C_r}{mv_x} & -1 - \dfrac{l_f C_f - l_r C_r}{mv_x^2} & \dfrac{C_f}{mv_x} \\ -\dfrac{l_f C_f - l_r C_r}{I_z} & -\dfrac{l_f^2 C_f + l_r^2 C_r}{mv_x^2} & \dfrac{l_f C_f}{I_z} \\ 0 & 0 & 1 \end{bmatrix}\begin{bmatrix} \beta_k \\ r_k \\ u_k \end{bmatrix} +$$

$$\begin{bmatrix} \dfrac{C_f}{mv_x} \\ \dfrac{l_f C_f}{I_z} \\ 1 \end{bmatrix}\Delta u + \begin{bmatrix} \dfrac{C_f}{mv_x} \\ \dfrac{l_f C_f}{I_z} \\ 0 \end{bmatrix}\delta_f$$

In some embodiments, the systems and methods described herein may be configured to establish a yaw rate reference model by minimizing deviation of yaw rate and rate of change of control action, and/r exploiting vehicle simulation software. The yaw rate reference model may be constrained by, at least, hard constraints of an actuator (e.g., or a steering system), which may be described according to:

$$|\delta_f| < \delta_{max}$$

$$|\Delta\delta_f| < |\Delta\delta_{max}|$$

Where other constraints may be described according to:

$$|r| < \frac{\mu g}{v_x}$$

Reference for tracking may be described according to:

$$r_{ref} = \tanh\left(\frac{v_x\delta_{driver}}{L\left(1 + \frac{K_{us}}{L}v_x^2\right)}\right)$$

In some embodiments, the systems and methods described herein may be configured to improve vehicle stability using active front steering (e.g., in a SbW steering system or other suitable steering system). The systems and methods described herein may be configured to use existing sensors (e.g., such as steering angle sensors and/or velocity sensors), without using yaw rate sensors and/or lateral acceleration sensors. The systems and methods described herein may be configured to use the MPC approach and/or any other suitable approach, such as sliding mode control, fuzzy logic sliding mode control, adaptive control, and/or the like.

In some embodiments, the systems and methods described herein may be configured to provide vehicle steering control. For example, the systems and methods described herein may be configured to receive at least one steering input value. The at least one steering input value may correspond to a driver input provided at a handwheel of the steering system. The systems and methods described herein may be configured to receive at least one vehicle speed value.

The systems and methods described herein may be configured to determine, based on the at least one steering input value and the at least one vehicle speed value, a vehicle sideslip angle and a yaw rate. For example, the systems and methods described herein may be configured to use a non-linear bicycle model, which may a Fiala tire model and/or other suitable model.

The systems and methods described herein may be configured to generate a reference yaw rate value based on the at least one steering input value, the at least one vehicle speed value, and a tire-road friction coefficient. The systems and methods described herein may be configured to generate an initial steering control value based on the vehicle sideslip angle, the yaw rate, and the reference yaw rate value. The systems and methods described herein may be configured to generate the initial steering control value using MPC, sliding mode control, fuzzy logic sliding mode control, adaptive control, and/or any suitable control approach or technique.

The systems and methods described herein may be configured to determine a final steering control value based on the initial steering control value and the at least one steering input value. The systems and methods described herein may be configured to selectively control at least one aspect of a vehicle steering system based on the final steering control value.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by a operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof. Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
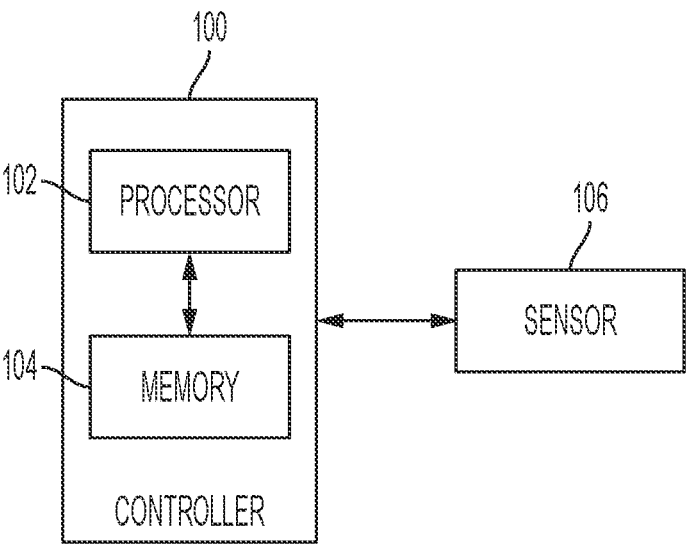
FIG. 2 generally illustrates a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, one or more radar sensors or devices, one or more lidar sensors or devices, one or more sonar sensors or devices, one or more image capturing sensors or devices, other suitable sensors or devices, or a combination thereof. The one or more signals may indicate a handwheel torque, a handwheel angle, a motor velocity, a vehicle speed, other suitable information, or a combination thereof.

In some embodiments, the controller 100 may be configured to provide vehicle steering control. For example, the controller 100 may receive at least one steering input value. The at least one steering input value may correspond to a driver input provided at a handwheel of the steering system. The controller 100 may receive at least one vehicle speed value.

The controller 100 may determine, based on the at least one steering input value and the at least one vehicle speed value, a vehicle sideslip angle and a yaw rate. For example, the controller 100 may to use a non-linear bicycle model, which may a Fiala tire model and/or other suitable model.

The controller 100 may generate a reference yaw rate value based on the at least one steering input value, the at least one vehicle speed value, and a tire-road friction coefficient. The controller 100 may generate an initial steering control value based on the vehicle sideslip angle, the yaw rate, and the reference yaw rate value. The controller 100 may generate the initial steering control value using MPC, sliding mode control, fuzzy logic sliding mode control, adaptive control, and/or any suitable control approach or technique.

The controller 100 may determine a final steering control value based on the initial steering control value and the at least one steering input value. The controller 100 may selectively control at least one aspect of a vehicle steering system and/or any suitable aspect of the vehicle 10 based on the final steering control value.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 4:
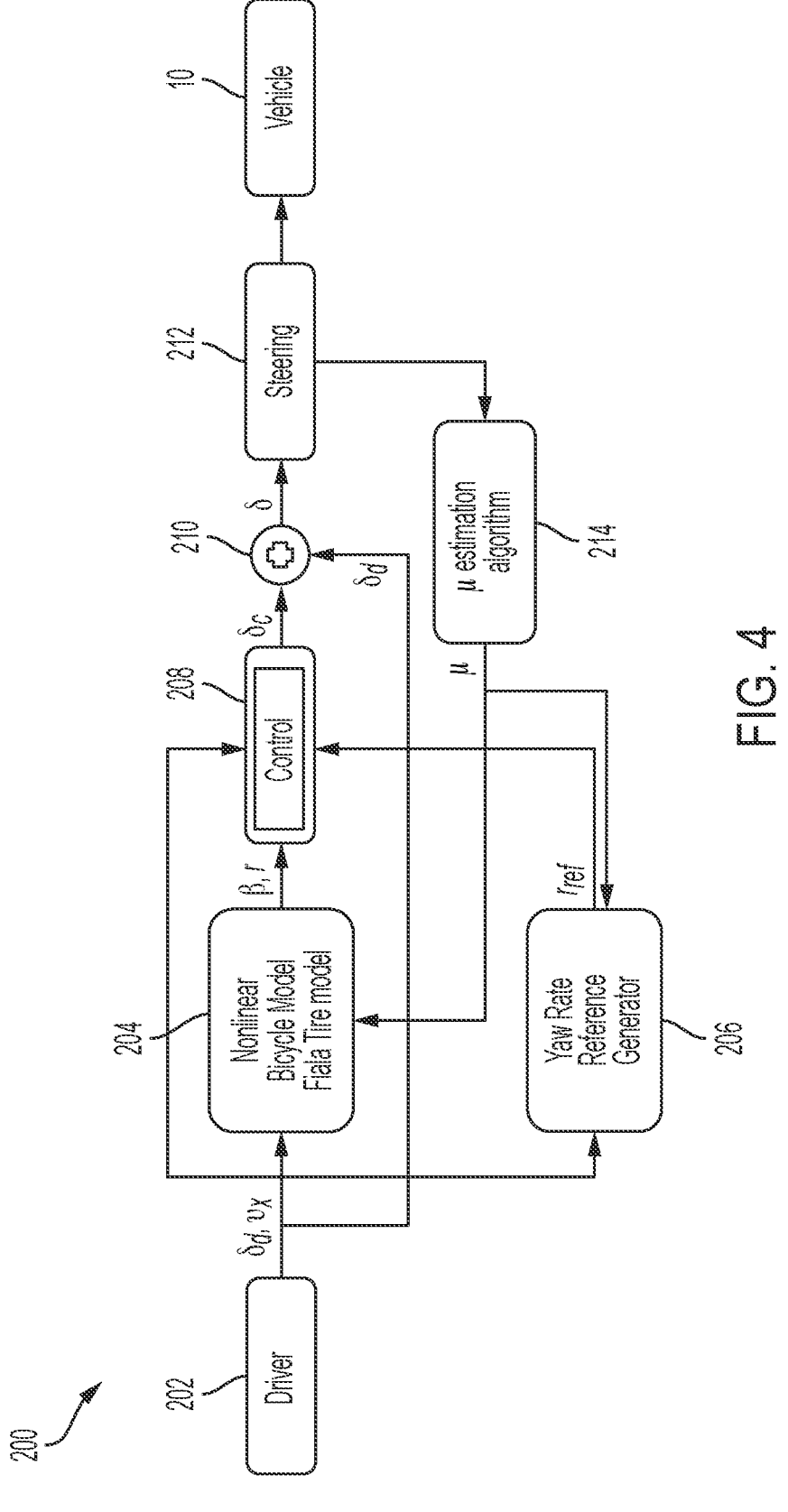
FIG. 4 is a flow diagram generally illustrating a steering control method according to the principles of the present disclosure

FIG. 4 generally illustrates a steering control method 200, according to the principles of the present disclosure. As described herein and illustrated in the figures, $\delta_d$ refers to driver steering input, $V_x$ refers to vehicle speed, $\beta$ refers to vehicle sideslip angle, $r$ refers to yaw rate, $r_{ref}$ refers to reference yaw rate, $\mu$ refers to tire-road friction coefficient, $\delta_c$ refers to a controller steering output (e.g., which may be referred to herein as an initial steering control output or value), and δ refers to a final steering signal (e.g., which may be referred to herein as a final steering control output or value), which may be sent to the steering system of the vehicle 10.

At 202, the method 200 includes receiving drive input, such as steering input and vehicle velocity. For example, the controller 100 may receive the driver input.

At 204, the method 200 provides the driver input to a non-linear bicycle model (e.g. that uses a Fiala tire model and/or other suitable model). The non-linear tire model may also receive a tire-road friction coefficient. The non-linear bicycle model may generate a vehicle sideslip angle and a yaw rate based on the drier input and/or the tire-road friction coefficient. For example, the controller 100 may generate the vehicle sideslip angle and the yaw rate based on the drier input and/or the tire-road friction coefficient, using the non-linear bicycle model.

At 206, the method 200, using a yaw rate reference generator, generates a reference yaw rate based on the driver input and/or the tire-road friction coefficient. For example, the controller 100 may, using the yaw rate reference generator, generate the reference yaw rate based on the driver input and/or the tire-road friction coefficient.

At 208, the method 200, using a control technique (e.g., such as those described herein, including, but not limited to MPC and/or any other suitable control approach or technique), determines a controller steering output based on the vehicle sideslip angle, the yaw rate, and the reference yaw rate. For example, the controller 100 may, using the control technique, determine the controller steering output based on the vehicle sideslip angle, the yaw rate, and the reference yaw rate.

At 210, the method 200 generates a final steering signal based on the driver steering input and the controller steering output. For example, the controller 100 may add the driver steering input and the controller steering output to generate the final steering signal. Additionally, or alternatively, the controller 100 may determine the final steering signal based on any suitable use of the driver steering input and the controller steering output.

At 212, the method 200 provides the final steering signal to a steering system control mechanism of the steering system. For example, the controller 100 may provide the final steering signal to a steering controller, which then may control at least one aspect of steering control and/or vehicle control of the vehicle 10 using the final steering signal, and/or the controller 100 may use the final steering signal to control at least one aspect of steering control and/or vehicle control of the vehicle 10.

At 214, the method 200 estimates the tire-road friction coefficient using a tire-road friction coefficient estimation algorithm and/or any other suitable technique. For example, the controller 100 may estimate the tire-road friction coefficient using the tire-road friction coefficient estimation algorithm and/or any other suitable technique.

Figure 5:
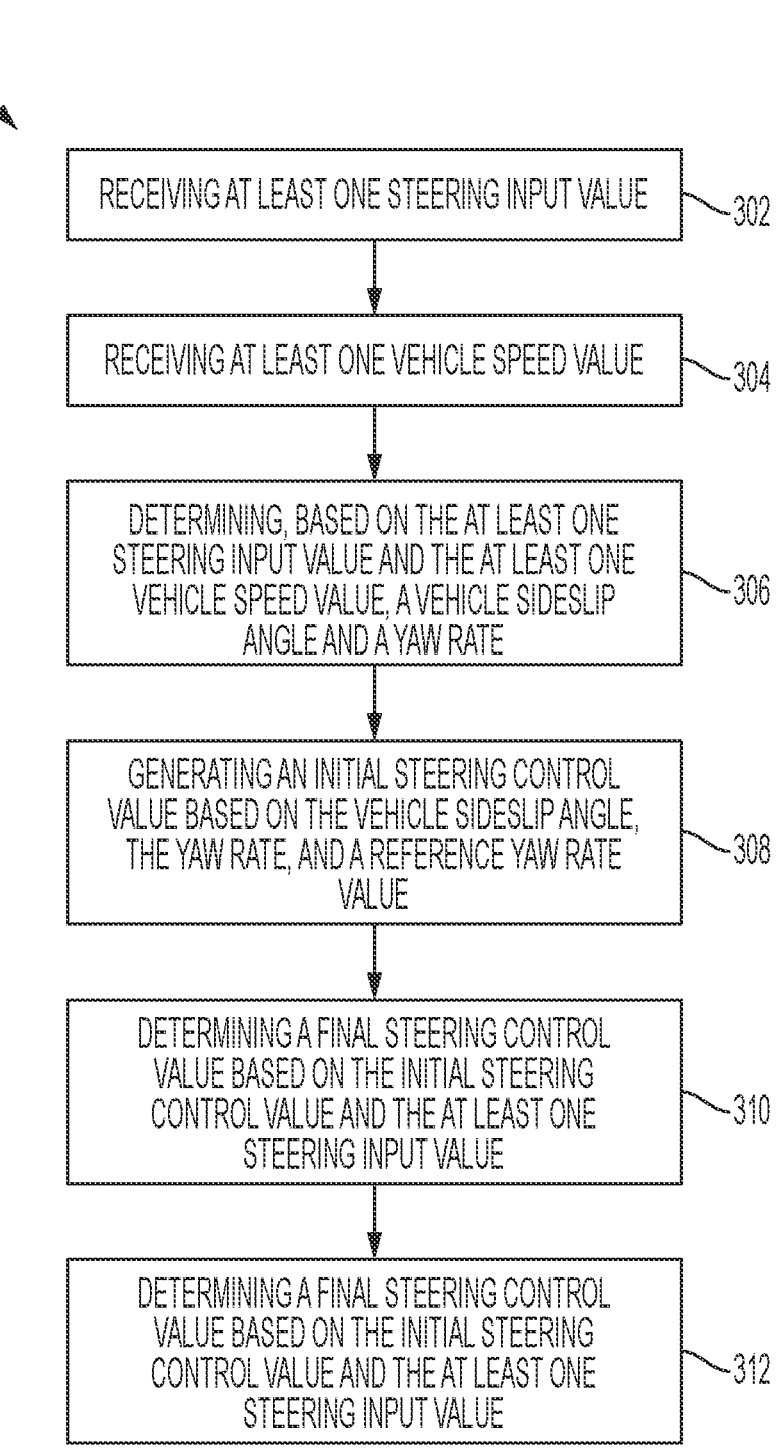
FIG. 5 is a flow diagram generally illustrating an alternative steering control method according to the principles of the present disclosure.

FIG. 5 is a flow diagram generally illustrating an alternative steering control method 300 according to the principles of the present disclosure. At 302, the method 300 receives at least one steering input value. For example, the controller 100 may receive the at least one steering input value.

At 304, the method 300 receives at least one vehicle speed value. For example, the controller 100 may receive the at least one vehicle speed value.

At 306, the method 300 determines, based on the at least one steering input value and the at least one vehicle speed value, a vehicle sideslip angle and a yaw rate. For example, the controller 100 may determine, based on the at least one steering input value and the at least one vehicle speed value, the vehicle sideslip angle and the yaw rate.

At 308, the method 300 generates an initial steering control value based on the vehicle sideslip angle, the yaw rate, and a reference yaw rate value. For example, the controller 100 may generate the initial steering control value based on the vehicle sideslip angle, the yaw rate, and the reference yaw rate value At 310, the method 300 determines a final steering control value based on the initial steering control value and the at least one steering input value. For example, the controller 100 may determine the final steering control value based on the initial steering control value and the at least one steering input value.

At 312, the method 200 selectively controls at least one aspect of a vehicle steering system based on the final steering control value. For example, the controller 100 may selectively control the at least one aspect of the vehicle steering system of the vehicle 10 and/or any other suitable aspect of the vehicle 10 based on the final steering control value.

In some embodiments, a method for steering control includes receiving at least one steering input value, receiving at least one vehicle speed value, and determining, based on the at least one steering input value and the at least one vehicle speed value, a vehicle sideslip angle and a yaw rate. The method also includes generating an initial steering control value based on the vehicle sideslip angle, the yaw rate, and a reference yaw rate value. The method also includes determining a final steering control value based on the initial steering control value and the at least one steering input value, and selectively controlling at least one aspect of a vehicle steering system based on the final steering control value.

In some embodiments, the vehicle steering system includes an electronic power steering system. In some embodiments, the vehicle steering system includes steer-by-wire steering system. In some embodiments, the at least one steering input value corresponds to a handwheel of the vehicle steering system. In some embodiments, determining, based on the at least one steering input value and the at least one vehicle speed value, the vehicle sideslip angle and a yaw rate includes using a non-linear bicycle model. In some embodiments, the non-linear bicycle model includes a Fiala tire model. In some embodiments, the method also includes generating the reference yaw rate value based on the at least one steering input value, the at least one vehicle speed value, and a tire-road friction coefficient. In some embodiments, generating the initial steering control value based on the vehicle sideslip angle, the yaw rate, and a reference yaw rate includes using model predictive control. In some embodiments, generating the initial steering control value based on the vehicle sideslip angle, the yaw rate, and a reference yaw rate includes using sliding mode control. In some embodiments, generating the initial steering control value based on the vehicle sideslip angle, the yaw rate, and a reference yaw rate includes using fuzzy logic sliding mode control. In some embodiments, generating the initial steering control value based on the vehicle sideslip angle, the yaw rate, and a reference yaw rate includes using adaptive control.

In some embodiments, a system for steering control includes a processor, and a memory. The memory includes instructions that, when executed by the processor, cause the processor to: receive at least one steering input value; receive at least one vehicle speed value; determine, based on the at least one steering input value and the at least one vehicle speed value, a vehicle sideslip angle and a yaw rate; generate an initial steering control value based on the vehicle sideslip angle, the yaw rate, and a reference yaw rate value; determine a final steering control value based on the initial steering control value and the at least one steering input value; and selectively control at least one aspect of a vehicle steering system based on the final steering control value.

In some embodiments, the instructions further cause the processor to determine, based on the at least one steering input value and the at least one vehicle speed value, the vehicle sideslip angle and a yaw rate using a non-linear bicycle model. In some embodiments, the non-linear bicycle model includes a Fiala tire model. In some embodiments, the instructions further cause the processor to generate the reference yaw rate value based on the at least one steering input value, the at least one vehicle speed value, and a tire-road friction coefficient. In some embodiments, the instructions further cause the processor to generate the initial steering control value based on the vehicle sideslip angle, the yaw rate, and a reference yaw rate using model predictive control. In some embodiments, the instructions further cause the processor to generate the initial steering control value based on the vehicle sideslip angle, the yaw rate, and a reference yaw rate using sliding mode control. In some embodiments, the instructions further cause the processor to generate the initial steering control value based on the vehicle sideslip angle, the yaw rate, and a reference yaw rate using fuzzy logic sliding mode control. In some embodiments, the instructions further cause the processor to generate the initial steering control value based on the vehicle sideslip angle, the yaw rate, and a reference yaw rate using adaptive control.

In some embodiments, an apparatus for steering control includes a processor and a memory. The memory includes instructions that, when executed by the processor, cause the processor to: receive at least one steering input value; receive at least one vehicle speed value; determine, based on the at least one steering input value and the at least one vehicle speed value and using a non-linear bicycle model, a vehicle sideslip angle and a yaw rate; generate a reference yaw rate value based on the at least one steering input value, the at least one vehicle speed value, and a tire-road friction coefficient; generate an initial steering control value based on the vehicle sideslip angle, the yaw rate, and the reference yaw rate value; determine a final steering control value based on the initial steering control value and the at least one steering input value; and selectively control at least one aspect of a vehicle steering system based on the final steering control value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations.

That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

13

What is claimed is:

1. A method for steering control, the method comprising:
receiving at least one steering input value;
receiving at least one vehicle speed value;
determining, based on the at least one steering input value and the at least one vehicle speed value, a vehicle sideslip angle and a yaw rate;
generating a reference yaw rate value (i) based on the at least one steering input value, the at least one vehicle speed value, and a tire-road friction coefficient, and (ii) constrained by at least one hard constraint of at least one associated actuator;
generating an initial steering control value based on the vehicle sideslip angle, the yaw rate, and the reference yaw rate value;
determining a final steering control value based on the initial steering control value and the at least one steering input value; and
selectively controlling at least one aspect of a vehicle steering system based on the final steering control value.

2. The method of claim 1, wherein the vehicle steering system includes an electronic power steering system.

3. The method of claim 1, wherein the vehicle steering system includes steer-by-wire steering system.

4. The method of claim 1, wherein the at least one steering input value corresponds to a handwheel of the vehicle steering system.

5. The method of claim 1, wherein determining, based on the at least one steering input value and the at least one vehicle speed value, the vehicle sideslip angle and a yaw rate includes using a non-linear bicycle model.

6. The method of claim 5, wherein the non-linear bicycle model includes a Fiala tire model.

7. The method of claim 1, further comprising generating the reference yaw rate value using a yaw rate reference model.

8. The method of claim 1, wherein generating the initial steering control value based on the vehicle sideslip angle, the yaw rate, and the reference yaw rate value includes using model predictive control.

9. The method of claim 1, wherein generating the initial steering control value based on the vehicle sideslip angle, the yaw rate, and the reference yaw rate value includes using sliding mode control.

10. The method of claim 1, wherein generating the initial steering control value based on the vehicle sideslip angle, the yaw rate, and the reference yaw rate value includes using fuzzy logic sliding mode control.

11. The method of claim 1, wherein generating the initial steering control value based on the vehicle sideslip angle, the yaw rate, and the reference yaw rate value includes using adaptive control.

12. A system for steering control, the system comprising:
a processor; and
a memory including instructions that, when executed by the processor, cause the processor to:
receive at least one steering input value;
receive at least one vehicle speed value;
determine, based on the at least one steering input value and the at least one vehicle speed value, a vehicle sideslip angle and a yaw rate;
generating a reference yaw rate value (i) based on the at least one steering input value, the at least one vehicle speed value, and a tire-road friction coefficient, and (ii) constrained by at least one hard constraint of at least one associated actuator;
generate an initial steering control value based on the vehicle sideslip angle, the yaw rate, and the reference yaw rate value;
determine a final steering control value based on the initial steering control value and the at least one steering input value; and
selectively control at least one aspect of a vehicle steering system based on the final steering control value.

13. The system of claim 12, wherein the instructions further cause the processor to determine, based on the at least one steering input value and the at least one vehicle speed value, the vehicle sideslip angle and a yaw rate using a non-linear bicycle model.

14. The system of claim 13, wherein the non-linear bicycle model includes a Fiala tire model.

15. The system of claim 12, wherein the instructions further cause the processor to generate the reference yaw rate value using a yaw rate reference model.

16. The system of claim 12, wherein the instructions further cause the processor to generate the initial steering control value based on the vehicle sideslip angle, the yaw rate, and the reference yaw rate value using model predictive control.

17. The system of claim 12, wherein the instructions further cause the processor to generate the initial steering control value based on the vehicle sideslip angle, the yaw rate, and the reference yaw rate value using sliding mode control.

18. The system of claim 12, wherein the instructions further cause the processor to generate the initial steering control value based on the vehicle sideslip angle, the yaw rate, and the reference yaw rate value using fuzzy logic sliding mode control.

19. The system of claim 12, wherein the instructions further cause the processor to generate the initial steering control value based on the vehicle sideslip angle, the yaw rate, and the reference yaw rate value using adaptive control.

20. An apparatus for steering control, the apparatus comprising:
a processor; and
a memory including instructions that, when executed by the processor, cause the processor to:
receive at least one steering input value;
receive at least one vehicle speed value;
determine, based on the at least one steering input value and the at least one vehicle speed value and using a non-linear bicycle model, a vehicle sideslip angle and a yaw rate;
generate a reference yaw rate value (i) based on the at least one steering input value, the at least one vehicle speed value, and a tire-road friction coefficient, and (ii) constrained by at least one hard constraint of at least one associated actuator;
generate an initial steering control value based on the vehicle sideslip angle, the yaw rate, and the reference yaw rate value;
determine a final steering control value based on the initial steering control value and the at least one steering input value; and
selectively control at least one aspect of a vehicle steering system based on the final steering control value.

* * * * *